(12) United States Patent
Bogart

(10) Patent No.: US 7,715,854 B2
(45) Date of Patent: May 11, 2010

(54) METHOD AND APPARATUS FOR ACTIVELY MONITORING PERSONAL CELLULAR DEVICES AND CONTROLLING ACCESS TO A CELLUAR COMMUNICATIONS NETWORK WITH AN AIRBORNE MOBILE PLATFORM

(75) Inventor: David W. Bogart, Renton, WA (US)

(73) Assignee: The Boeing Company, Chicago, IL (US)

( * ) Notice: Subject to any disclaimer, the term of this patent is extended or adjusted under 35 U.S.C. 154(b) by 976 days.

(21) Appl. No.: 11/479,140

(22) Filed: Jul. 1, 2006

(65) Prior Publication Data

US 2008/0004040 A1 Jan. 3, 2008

(51) Int. Cl.
*H04W 24/00* (2009.01)

(52) U.S. Cl. .............. 455/456.4; 455/456.1; 455/404.2; 455/414.1; 455/553.1; 455/41.1

(58) Field of Classification Search .............. 455/456.1, 455/404.2, 414.1, 553.1, 41.1–41.2
See application file for complete search history.

(56) References Cited

U.S. PATENT DOCUMENTS

| | | | |
|---|---|---|---|
| 5,670,742 A | 9/1997 | Jones | |
| 6,308,044 B1 * | 10/2001 | Wright et al. | ............... 455/431 |
| 6,477,152 B1 | 11/2002 | Hiett | |
| 6,745,023 B1 | 6/2004 | Offer | |
| 7,162,285 B2 | 1/2007 | Owens et al. | |
| 7,350,753 B2 | 4/2008 | Guidon et al. | |
| 2002/0160773 A1 | 10/2002 | Gresham et al. | |
| 2005/0164635 A1 * | 7/2005 | Yang et al. | ............... 455/41.2 |

(Continued)

FOREIGN PATENT DOCUMENTS

DE 19832633 1/2000

(Continued)

OTHER PUBLICATIONS

PCT International Search Report and Written Opinion for International Application No. PCT/US2007/010840 dated Dec. 3, 2007, 15 pages.

(Continued)

*Primary Examiner*—Patrick N Edouard
*Assistant Examiner*—Wayne Cai
(74) *Attorney, Agent, or Firm*—Harness, Dickey & Pierce, P.L.C.

(57) ABSTRACT

A method for monitoring and controlling operation of wireless personal electronic devices (PEDs) present on a mobile platform (MP). The method may involve defining at least one phase of operation of the MP where the use of wireless PEDs is prohibited. A wireless communications system on the MP may monitor and detect signals being transmitted by wireless PEDs present on the MP. The system may detect a transmission from a wireless PED located on the MP that occurs during the one phase of operation. An identification code associated with a specific one of the wireless PEDs that is detected as operating during the one phase of operation may be recorded in a file. The file may thereafter be checked during a second phase of operation where use of the wireless PEDs is permitted, and access may be denied to any wireless PED whose identification code is stored in the database.

18 Claims, 6 Drawing Sheets

U.S. PATENT DOCUMENTS

| | | | |
|---|---|---|---|
| 2007/0072590 A1* | 3/2007 | Levitan | 455/414.1 |
| 2007/0155421 A1* | 7/2007 | Alberth et al. | 455/553.1 |
| 2008/0085691 A1* | 4/2008 | Harvey et al. | 455/187.1 |
| 2009/0117919 A1* | 5/2009 | Hershenson | 455/456.4 |

FOREIGN PATENT DOCUMENTS

| | | |
|---|---|---|
| EP | 0891110 | 1/1999 |
| EP | 1 096 699 | 5/2001 |
| FR | 2793106 | 11/2000 |
| WO | WO 0145064 | 6/2001 |

OTHER PUBLICATIONS

Gupta, Puneet. Pico Cell Technology Improves Cellular Investment, TechRepublic, Aug. 16, 2002, 1 page.

http://www.cpfindusprod.com/AGHT/aght.html "AgHT™ Film Product Line," CPFilms Inc., Martinsville, VA, 2001, 1 page.

* cited by examiner

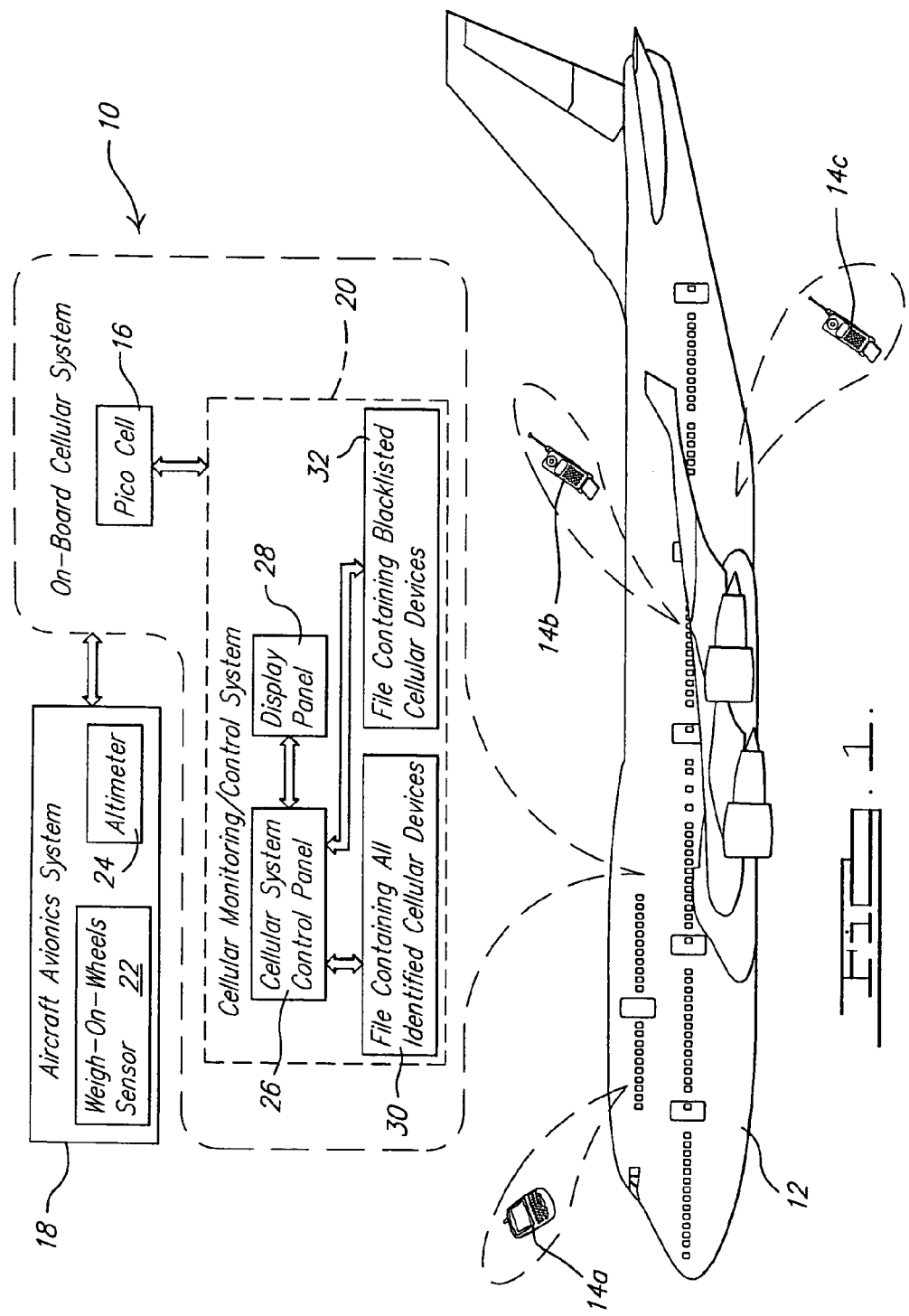

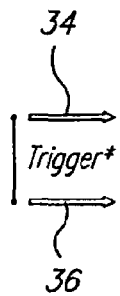

| State | Cellular System Behavior |
|---|---|
| 1. Boarding | "Listening" & "Reporting" Cellular Devices |
| 2. Doors Closed | "Listening" & "Reporting" Violating Cellular Devices |
| 3. Taxi Out/Delayed | "Listening" & "Reporting" Violating Cellular Devices |
| 4. Takeoff | "Listening", "Reporting", Clear Black List And Begin Logging New Black Listed Devices |
| 5. Landing | Pico Cell "Listening", "Reporting" & Logging Violations |
| 6. Taxi/Delayed | Pico Cell "Listening", "Reporting" & Logging Violations |
| 7. Deplaning | Pico Cell "Listening" And "Reporting" |

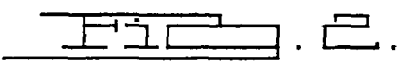

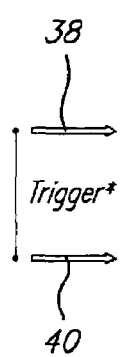

| State | Cellular System Behavior |
|---|---|
| 1. Climb | "Listening", "Reporting" & Updating New Black List With Cellular Devices Violating Operating Instructions |
| 2. 10,000' ↗ | "Two-Way" Comm, Denies Service To Black Listed Devices |
| 3. Cruise | "Two-Way" Comm, Denies Service To Black Listed Devices |
| 4. Descent | "Two-Way" Comm, Denies Service To Black Listed Devices |
| 5. 10,000' ↘ | "Listening", "Reporting" Violating Devices |
| 6. Approach | "Listening", "Reporting" Violating Devices |
| 7. Landing | "Listening", "Reporting" Violating Devices |

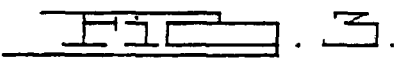

| Operational Phase | Definition |
|---|---|
| Park/Gate | On-ground, aircraft stationary/parked |
| Taxi-Out | Taxiing between Park/Gate position and active runway |
| Departure | Entering active runway, take-off and climb out operations below 10,000 feet |
| Cruise | Flight altitude above 10,000 feet |
| Arrival | Approach and descent operations below 10,000 feet, landing and exiting active runway |
| Taxi-In | Taxiing between active runway and Park/Gate position |

FIGURE 4

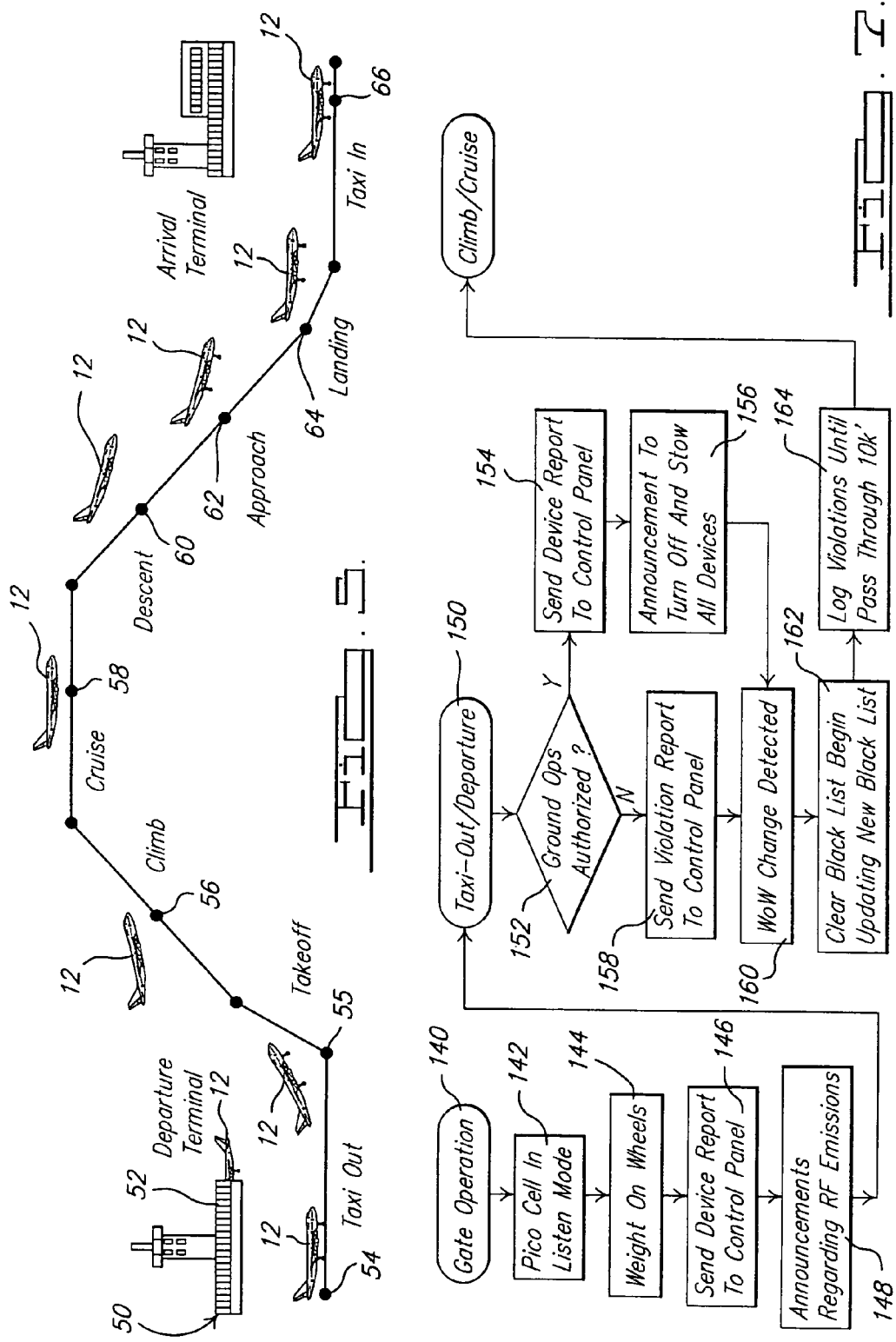

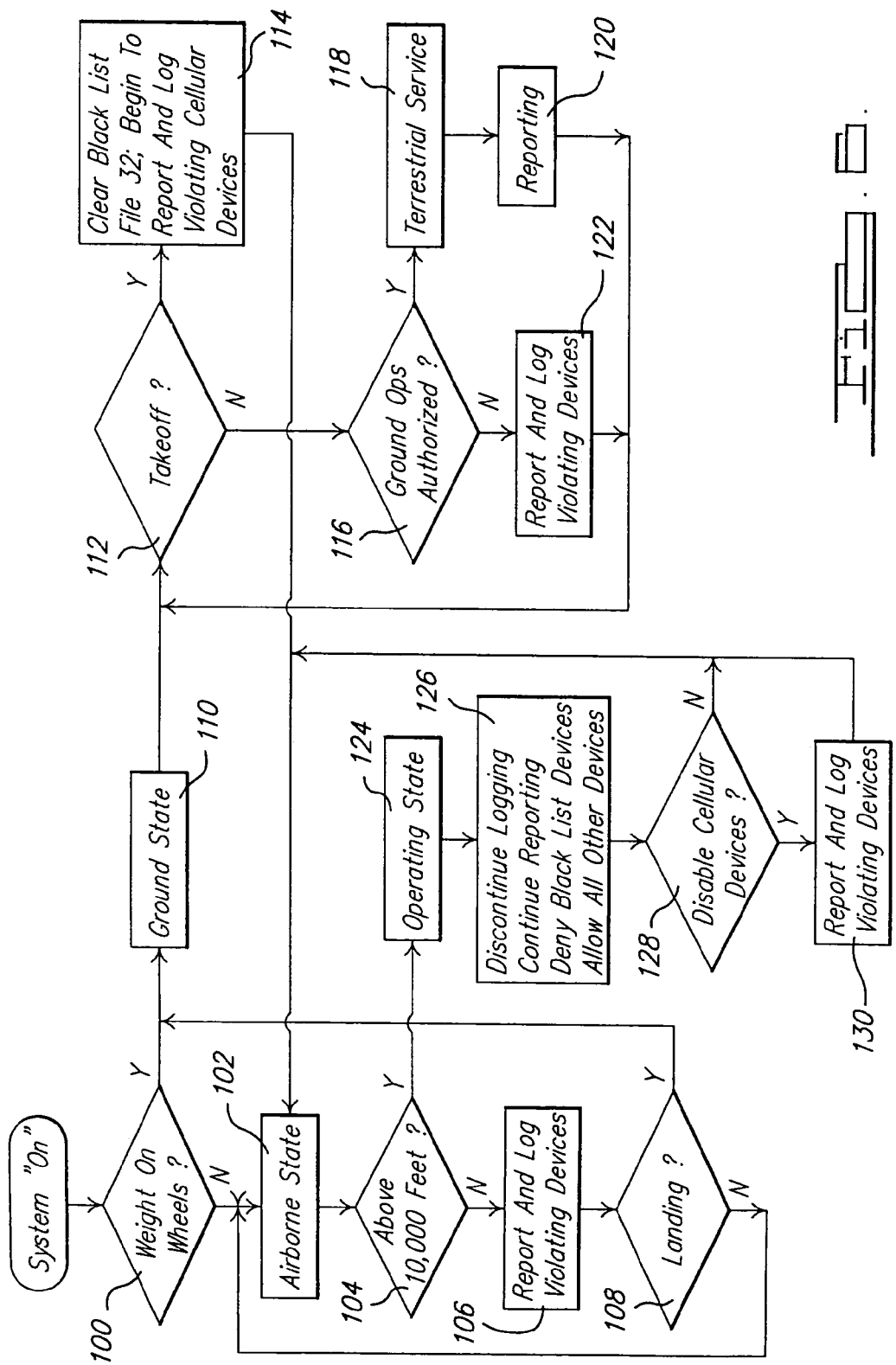

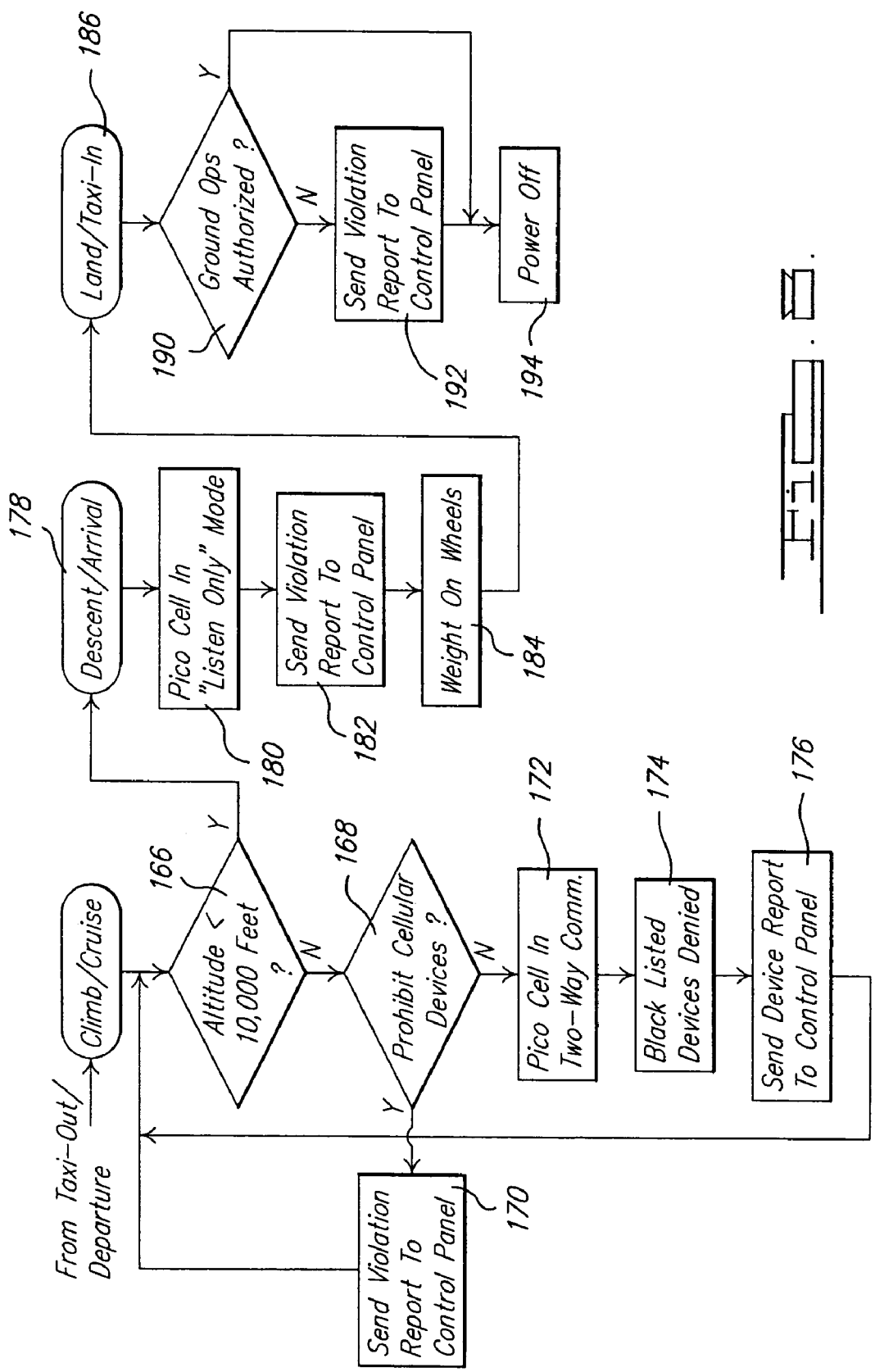

METHOD AND APPARATUS FOR ACTIVELY MONITORING PERSONAL CELLULAR DEVICES AND CONTROLLING ACCESS TO A CELLUAR COMMUNICATIONS NETWORK WITH AN AIRBORNE MOBILE PLATFORM

TECHNICAL FIELD

The present disclosure relates to communication systems within mobile platforms, for example aircraft, and more particularly to a method and system which monitors the operation of personal electronic devices ("PEDs") being carried on the mobile platform and restricts access to an on-board communications network to any such device found to be operating during certain operational phases of the mobile platform where use of such PEDs has been prohibited.

BACKGROUND

The statements in this section merely provide background information related to the present disclosure and may not constitute prior art.

Present day mobile platforms, for example commercial aircraft, are being equipped with on-board communications systems that enable wireless personal electronic devices ("PEDs") of crew and passengers to connect to off-board terrestrial communication networks. For example, such communication systems are often cellular systems that facilitate communication with cellular phones/devices of crew members and passengers. Cellular systems employed on commercial aircraft are expected to have one or more "picocells" within the aircraft to facilitate wireless communication with on-board cellular devices while the mobile platform is in operation. Such picocells thus allow cellular devices present on the aircraft to use an on-board cellular network of the aircraft to connect with an off-board cellular network. Thus, passengers and crew members will soon be able to use their own cellular devices while airborne in a commercial aircraft, in accordance with applicable rules and regulations set forth by various regulatory bodies and/or airlines operating the aircraft.

In view of this new communications capability with wireless PEDs, some form of control is required that detects use of wireless PEDs during critical phases of mobile platform operation, where such use is not permitted, and thereafter prevents use of the on-board wireless communication network by those PEDs that have violated the rules regulating their use. Such a system and method would also ideally be able to detect the presence of unattended PEDs, such as unattended cellular devices, for example cellular devices located in a cargo bay of an aircraft, if such devices are turned "on" during prohibited times of use during operation of the mobile platform. The system and method would ideally then prohibit those devices from communicating through the on-board cellular system of the aircraft to a terrestrial based cellular network. Such control may be implemented for many reasons, one of which is for security purposes.

Therefore, a need has arisen, particularly in the commercial passenger aircraft industry, to provide a means of monitoring and detecting when wireless PEDs are turned on, and enforcing a requirement to turn off PEDs during predetermined critical phases of mobile platform of operation.

SUMMARY

The present disclosure is directed to a method and system for monitoring the operation of personal electronic devices ("PEDs") carried on a mobile platform, determining when such devices are operating during those times where use of such devices is not authorized, and thereafter prohibiting use of any such PED during those phases of mobile platform operation where the use of PEDs would be otherwise allowed.

In one implementation, the present disclosure is directed to detecting the use of personal cellular devices, such as cellular phones, carried on to commercial passenger aircraft by crew and passengers, or carried in checked bags or carry-on bags. The system makes use of an on-board cellular network that monitors and detects when each cellular device being carried on the aircraft, either by a passenger or in any other area of the aircraft (e.g., overhead stowage bins or cargo bay), is operating. The system also contemplates defining to passengers on the aircraft when operation of cellular devices is prohibited, and when operation is permitted. The cellular system is used to detect signals from the cellular devices, and to note those particular cellular devices that are operating during unauthorized times. Thereafter, any cellular device that has been identified as turned "on" during a time period in which personal cellular device use is prohibited, will thereafter be prohibited by the system from accessing and making use of the on-board cellular network on the aircraft during those times of operation where personal cellular device use would otherwise be permitted.

In one implementation, a first prohibited operational phase of the aircraft comprises the time when the aircraft on a ground surface taxiing to a runway preparing for take-off, to the time when the aircraft reaches a predetermined altitude during its ascent (i.e., "climb" phase of flight). A second operational phase or time period during which use of cellular devices is prohibited is defined as a landing phase of operation between when the aircraft descends below a predetermined altitude, until the aircraft has landed and has finished a taxiing operation. Alternatively, the aircraft captain or crew member can instruct passengers, once the aircraft has landed and is taxiing, that PED use is authorized.

In various implementations, the system records an identification code from each cellular device attempting to access the on-board cellular network. Those devices found to be operating during times when the use of PEDs are not permitted are logged into a "blacklist" cellular device file. All such cellular devices logged into the "blacklist" cellular device file are thereafter denied access to the cellular system on the aircraft, and thus prohibited from using the on-board cellular system of the aircraft during the remainder of a flight of the aircraft.

The system and method provides significant security benefits to aircraft operators by eliminating potential sources of interference with important avionics equipment on-board the aircraft, during various phases of operation of the aircraft (e.g., take-offs and landings). Importantly, the system and method can be used to restrict use of PEDs in the cargo bay of an aircraft that are unattended, and that are attempting to operate during prohibited times of operation, so that any such PED cannot access an off-board communications network. The present disclosure, however, is not limited to cellular PEDs, but rather could just as readily be applied to other RF technologies such as WiFi.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a simplified block diagram of one implementation of an embodiment of the system of the present disclosure;

FIG. 2 is a table illustrating different "ground" operating states of a commercial passenger aircraft, and the corresponding operating mode of the system during each state;

FIG. 3 is a table illustrating different "airborne" states of operation of a commercial passenger aircraft, and the corresponding operating mode of the system;

FIG. 4 is a table defining typical phases of flight of a commercial passenger aircraft;

FIG. 5 is a simplified diagram of the various phases of flight of a commercial passenger aircraft, and illustrating the points therealong during which use of cellular devices carried on the aircraft would be prohibited, as well as those operational phases during which use of cellular devices would be permitted;

FIG. 6 is a flowchart of basic operations of one implementation of the present disclosure;

FIG. 7 illustrates a more detailed, exemplary listing of various operations performed by a system and method of the present disclosure between the time that a commercial aircraft is at a gate, to the point at which it is climbing to a cruise altitude; and FIG. 8 illustrates various exemplary operational phases of the aircraft between the time when the aircraft is climbing to a cruise altitude, to a point where the aircraft has landed and is taxiing to a gate at an airport.

DETAILED DESCRIPTION

The following description is merely exemplary in nature and is not intended to limit the present disclosure, application, or uses. It should be understood that throughout the drawings, corresponding reference numerals indicate like or corresponding parts and features.

Overview of System

Referring to FIG. 1, a wireless communications system 10 in accordance with one embodiment of the present disclosure is illustrated. The system 10 is used to identify operating, wireless personal electronic devices (PEDs) present on a mobile platform and to prevent use of an on-board communications network on the mobile platform by those PEDs that are detected as being turned on during times at which operation of PEDs is prohibited. By the term "turned on", as used throughout the following discussion, it is meant that the PED is powered on and in a mode of operation where it is transmitting (i.e., not in any form of "flight safe" mode, where the device is powered on but transmitting operations are inhibited).

While the present disclosure will be discussed in connection with reference to a "cellular" communications system on board an aircraft 12, and the monitoring of "cellular devices" as the wireless PEDs of interest, it will be appreciated that the principles and teachings presented in the present disclosure are just as applicable to other electromagnetic wave based systems, for example WiFi systems, and virtually any other form of wireless PED that might be brought onto a mobile platform by a crew member or passenger. Also, while the following discussion and FIG. 1 references a commercial passenger aircraft as the mobile platform on which the system 10 is implemented, it will be appreciated that the system 10 could just as readily be implemented in other forms of mobile platforms such as trains, busses, marine vessels, rotorcraft, etc. The system 10 could also just as readily be implemented in a fixed (non-movable) building or structure, where it is important to detect/control the use of cellular devices that may be attempting to connect to an available wireless network outside the structure.

FIG. 1 illustrates three cellular devices 14A, 14B and 14C that are present on-board the aircraft 12. In this example, cellular device 14C happens to be located in a cargo compartment of the aircraft 12. Cellular devices 14A and 14B are present in a passenger cabin area of the aircraft 12. The system 10 includes an on-board picocell 16 which forms a cellular access point for the cellular devices 14 inside the fuselage of the aircraft 12. Typically, the picocell 16 is located in either a crew compartment area or a passenger cabin area of the aircraft 12. The system 10 is in communication with an avionics system 18 of the aircraft 12. The system 10 also includes an integrated cellular monitoring/control system 20. The aircraft avionics system 18 may be able to receive "weight-on-wheels" information 22 (either directly from a sensor or derived from aircraft speed) for determining if the aircraft 12 is on the ground, as well as an altimeter 24 for providing altitude information to the system 10 during flight of the aircraft 12.

The cellular monitoring/control system 20 of the system 10 is in communication with both the aircraft avionics system 18 and the picocell 16. For convenience, the cellular monitoring/control system 20 will be referred to throughout the following discussion as simply the "control system" 20, even though it will be understood that the control system 20 performs monitoring as well as control operations.

The system 10 also includes a cellular system control panel 26 and a display panel 28. The cellular system control panel 26 is in communication with a file 30 containing a listing of all identified cellular devices that are operating in the aircraft 12. The control panel 26 is further in communication with a file 32 containing a listing of all "blacklisted" cellular devices. Blacklisted cellular devices are those cellular devices 14 that have been found to be operating during phases of operation of the aircraft 12 where the use of cellular devices is not permitted (e.g., where a prior announcement, for example over a PA system in the aircraft 12, has been made to passengers to clearly inform them when operation of PEDs is not permitted). In this regard, it will be appreciated that each cellular device 14 transmits a unique identification code (i.e., signal) when it is initially turned "on", and often at periodic intervals thereafter, which code signal attempts to wirelessly identify and register with any available cellular network in its vicinity. These identification code signals are what are monitored for by the picocell 16 of the system 10 during a "listen only" operating mode. Any cellular device 14 that is identified and added to the blacklisted cellular devices file 32 will be denied access to the cellular system 10 during those subsequent phases of flight of the aircraft 12 where access to the system 10 and use of cellular devices to connect with terrestrial cellular networks would otherwise be permitted. Cellular devices 14 that are listed in the blacklisted cellular devices file 32 are effectively instructed by the system 10 into a "no service" state for the duration of the flight of the aircraft 12. Such control over the cellular devices 14 is available with Second Generation (2G), Third Generation (3G) or later wireless telephone technologies (e.g., CDMA/GSM/UMTS/WCDMA/HSPA/WiFi, etc.) that support emission controls.

Operational Phases of the Aircraft

Initially, various operational phases of the aircraft 12 are defined during which operation of on-board cellular devices 14 is permitted, and during which operation of on-board cellular devices is not permitted. Typically, an aircraft crew member makes an announcement over an internal PA system of the aircraft 12 informing passengers of those times during which use of cellular devices is not permitted, and again informs passengers when use of cellular devices is permitted. FIG. 2 is a chart illustrating system 10 behavior during various phases of operation of the aircraft 12 that occur while the aircraft 12 is on the ground at an airport. FIG. 3 is a chart illustrating system 10 behavior during various operational phases of the aircraft 12 while the aircraft is airborne. In FIG. 2, trigger points 34 and 36 are noted where the weight-on-wheels information 22 may be used to determine when the aircraft 12 has left the ground and when the aircraft has touched down on the ground during a landing procedure. States 2-6 in FIG. 2 may be used to alert crew members on the aircraft 12 of how many cellular devices have been left "on" during operational states where cellular device use is not authorized. This information may be displayed on the display panel 28 (FIG. 1). States 2, 3 and 6 in FIG. 2 may or may not represent cellular device use violations depending on specific guidelines set forth by an airline company operating the aircraft 12. In this instance, airline crew members may decide what action to take based on the information being reported by the system 10. The operation of "listening and reporting" cellular devices involves the system 10 listening for cellular devices 14 that are turned "on" and transmitting identification code signals, and reporting all such devices to the control system 20. State number 4 in FIG. 2, for example, provides for clearing the blacklisted cellular devices file 32, and beginning to log new blacklisted cellular devices that have been identified as being turned on during a period where no cellular device use is allowed (i.e., violating a "no operation" condition). At states 5 and 6 in FIG. 2, the operation of "logging violations" is where cellular devices 14 that have been identified as violating a "no operation" condition are written into the blacklisted cellular devices file 32.

In FIG. 3, information from the altimeter 24 (FIG. 1) is used to identify trigger points 38 and 40 that define a window therebetween during which use of cellular devices 14 is permitted. However, as explained above, those cellular devices 14 that had previously been found to be operating during times where no cellular operation is allowed are denied access to the system 10 by the control system 20. Any cellular devices 14 that have not previously been in violation of a "no operation" condition, but which thereafter, during a landing approach, violate a "no operation" condition, may be added to the blacklisted cellular devices file 32. In FIG. 3, during states 5, 6 and 7, the crew of the aircraft 12 can be alerted via the display panel 28 as to how many cellular devices 14 have been left "on" during the previous take-off and climb phases of operation, where cellular device use is not permitted. The 10,000 foot (3033 meters) altitude figure denoted in states 2 and 5 in FIG. 3 is merely exemplary, and could be set at other appropriate altitudes. However, if the 10,000 foot altitude is used, an ARINC 429 altitude message could be used to indicate when the 10,000 foot altitude is reached and to automatically enable the system 10 for two-way communications with on-board cellular devices. Alternatively, a manual turn-on/turn-off of the system 10 could be performed by a crew member, via the control panel 26, once the crew member is notified that the 10,000 foot altitude has been reached. Additional exemplary definitions of various aircraft flight phases are provided in the table of FIG. 4.

FIG. 5 illustrates various actions and operations taken by the system 10 and by crew members during various phases of a typical flight. At point 50, prior to boarding the aircraft 12, gate agents of an airline may announce that passengers should verify that all PEDs must be turned off prior to departure, including devices in carry-on luggage. In operational phase 52, boarding of the aircraft 12 is commencing. Passengers may be notified by airline personnel where the list of PEDs that may be used during later phases of flight can be found. Typically, airline personnel will request that all PEDs be turned off for departure. At point 54, boarding has completed and the cabin doors of the aircraft 12 are closed. Crew members of the aircraft 12 may announce that all PEDs must be turned off, that the flight is ready to depart, and that all carry-on items including PEDs must be safely stowed. An announcement may be made as to when permitted PEDs may be used. At point 55 the aircraft is in its takeoff phase of operation. If the system 10 detects a cellular device 14 that is turned on thereafter, the device will be reported and logged into the blacklisted cellular devices file 32.

At point 56, the aircraft 12 is established in its climb. A crew member may announce that approved PEDs may be used and that all other devices must remain off. At this point any cellular device 14 that is turned "on" will be detected (because of its unique identification code), logged by the control system 26 into the cellular devices file 30, and permitted to use the system 10 for two-way cellular communications. During a cruise operational phase indicated at point 58, a crew member may announce that all permitted PEDs may be used. At point 60, the aircraft 12 is beginning its descent in preparation for landing. At this point, a crew member may announce that all PEDs must be turned off and safely stowed for the remainder of the flight. Any cellular device 14 detected to be turned "on" after this point will be reported by the system 10 and logged into the blacklisted cellular device file 32 by the control system 26. Alternatively, the crew member may announce that PEDs must be turned off and safely stowed for the remainder of the flight, with exception that specific types of PEDs not stowed in overhead bins may be used during taxi to a gate at the airport. Cellular devices 14 that are not turned off within a short predetermined time interval, for example one minute, will thereafter be logged into the blacklisted cellular devices file 32 by the control system 20. Operational points 60, 62 and 64 represent the approach and landing phases of operation of the aircraft 12 during which all PEDs typically must be turned off. At point 66, the aircraft 12 has landed and is beginning a taxi-in operation to the gate at which de-planing will occur. At this point, a crew member may announce that all carry-on items must be remain safely stowed, with the exception of specific operator permitted PEDs. The crew member may also announce that all PEDs must remain off until the aircraft 12 has arrived at its gate and the captain has turned off the fasten seat belt sign inside the aircraft 12. Alternatively, the crew member may announce that specific PEDs may now be used if expressly permitted by the captain, and that all other PEDs must remain off and stowed until arrival at the gate or until the captain has turned off the fasten seatbelt sign.

Thus, when the aircraft 12 is on the ground, the system 10 is not fully operational, but rather is placed in the "listen only" mode by the control system 20. No cellular operation is allowed during taxiing operations, unless permitted by the captain of the aircraft 12. An airline may allow full cellular operation to those cellular devices 14 that are not in the file of blacklisted cellular devices 32 when the aircraft 12 is parked, has a delayed departure, etc. When the aircraft 12 is airborne, the system 10 is in the "listen only" mode during take-off and landing operations. However, when the aircraft is operating above 10,000 feet, two-way communications via the system 10 is enabled for those cellular devices 14 that have not been logged in the blacklisted cellular devices file 32.

It will be appreciated that the system 10 could readily provide crew members with the ability to manually control the system 10 via the control panel 26 to restrict cellular services in the event of in-flight emergencies or for other reasons. In such event, the system 10 could be turned completely off or placed in the "listen only" mode. Still further, a mode could be implemented from the control panel 26 by which only airline or approved government agency PEDs are allowed to access the system 10. This would require such devices to include identification codes that would enable the control system 20 to recognize that such PEDs are associated with the airline or with a government agency, and therefore are permitted full use of the system 10. Thus, this feature could be allowed to permit only Federal Air Marshalls to use the system 10 during in-flight emergencies.

FIG. 6 illustrates a flowchart setting forth further basic operational procedures performed by the system 10. Initially, when the system 10 is powered on, the weight-on-wheels information 22 is checked to determine if the aircraft 12 is on the ground, as indicated in operation 100. If the answer to this inquiry is "no", then the system 10 knows that the aircraft 12 is in an airborne state, as indicated at 102. An inquiry is then made in operation 104 as to whether the aircraft is above 10,000 feet (3033 meters). If the answer to this inquiry is "no", then the system 10 begins reporting any cellular devices 14 that have been found to be operating during prohibited times of operation, and the control system 20 logs such violating devices into the blacklisted cellular devices file 32, as indicated at operation 106. A check is then made of the weight-on-wheels information 22 to determine if the aircraft 12 has landed, as indicated in operation 108, and if not, the inquiry in operation 104 is repeated. If the inquiry at operation 100 produces a "yes" answer, or if the inquiry at operation 108 produces a "yes" answer, then it is assumed that the aircraft 12 is on the ground as indicated at 110. A check of the weight-on-wheels information 22 is then made at operation 112 to determine if the aircraft 12 has taken off from the ground. If the answer to this inquiry is "yes", then the blacklisted cellular devices file 32 is cleared of any entries, and reporting and logging of violations is performed as indicated at operation 114. If the answer to the inquiry at operation 112 is "no", then a check is made at operation 116 to determine if the use of cellular devices 14 is authorized while the aircraft 12 is on the ground. If this inquiry produces a "yes" answer, then service is provided through a terrestrial cellular service as indicated at operation 118. In operation 120, reporting of those cellular devices 14 that are turned on begins, and operation 112 is repeated. All cellular devices 14 that are turned on have their respective identification codes reported and logged into the cellular devices file 30 in FIG. 1. If the answer at operation 116 is "no", then the system 10 begins reporting and logging the identification codes of those cellular devices 14 that are turned on in violation of a previously made announcement that cellular devices must be turned off, as indicated at operation 122, and operation 112 is then repeated.

With further reference to FIG. 6, if the determination in operation 104 indicates a "yes" answer that the aircraft 12 is operating above an altitude of 10,000 feet, then an airborne operating state 124 is entered. At operation 126, the logging of cellular devices 14 into the blacklisted cellular devices file 32 is discontinued, but the operation of any cellular device 14 that is detected by the picocell 16 of the system 10 is reported and logged in the cellular devices file 30. Any cellular devices 14 that have been logged into the blacklisted cellular devices file 32 are denied access to the system 10 by the control system 20. All other cellular devices that are operating, but that are not identified in the blacklisted cellular devices file 32, are allowed access to the system 10. In operation 128, an inquiry is made as to whether any cellular devices 14 are to be disabled because of violating a crew directed "no operation" condition. If the answer to this inquiry is "yes", then violating cellular devices are reported and logged by the control system 20, in operation 130, into the blacklisted cellular devices file 32, and operation 104 is repeated. If the answer is "no", then operation 104 is repeated.

FIG. 7 summarizes the basic operational steps performed by the system 10 during phases of operation of the aircraft 12 from the point at which the aircraft is at the gate of an airport, to the point at which the aircraft is performing a climb to its cruising altitude. When at a gate, as indicated at 140, the picocell 16 of the system 10 is placed in a "listen only" mode by the control system 20, as indicated in operation 142. In operation 144, the weight-on-wheels information 22 is checked. In operation 146, a report of all operating cellular devices 14 on the aircraft 12 is sent to the cellular system control panel 26. A crew member may then make announcements, at operation 148, regarding emissions from PEDs. In operation 150, the aircraft 12 begins a taxi-out/departure operation. At operation 152, an inquiry is made if ground operation of cellular devices 14 has been authorized. If the answer to this inquiry is "yes", then a report of all operating cellular devices 14 on the aircraft 12 may be provided to the cellular system control panel 26, at operation 154. In operation 156 an announcement may be made to turn off and stow all cellular devices. If the inquiry at operation 152 produces a "no" answer, then any one or more cellular devices 14 that are found to be in violation of a "no operation" condition are reported to the control panel 26 and logged into the blacklisted cellular devices file, as indicated at operation 158. After either operation 156 or 158, at operation 160 the weight-on-wheels information 22 is checked to see if it indicates that the aircraft 12 has left the ground and is in a climb phase of flight up to its cruise altitude. Thereafter, at operation 162, the blacklisted cellular devices file 32 may be cleared of any preexisting entries and updating of the file 32 with new entries performed. Thus, operation 162 provides a means to clear the blacklisted cellular devices file 32 of those cellular devices that were previously found to be in violation of a "no operation" condition during a previous flight of the aircraft 12. The "updating" performed at operation 162 is therefore directed only to those cellular devices 14 which have been found to be in violation of a previous "no operation" condition between the time that the aircraft 12 has left the gate and begun its climb phase of operation. At operation 164, cellular devices 12 that are in violation of a "no operation" condition are logged by the control system 20 until the aircraft 12 passes through an altitude of 10,000 feet.

The flowchart of FIG. 8 continues the exemplary flight/ operation of the aircraft 12. In operation 166, a check is made to determine if the aircraft 12 is still below an altitude of 10,000 feet. If the answer to this inquiry is "no", then a determination is made if the use of cellular devices is prohibited, as indicated at operation 168. If the answer to this inquiry is "yes", then a report containing the identification codes of all the cellular devices 14 that are in violation of a "no operation" condition are reported to the cellular system control panel 26, as indicated at operation 170, and then operation 166 is repeated. If the answer at operation 168 is "no", then the picocell 16 is used to enable wireless two-way communications with the system 10, as indicated at operation 172. In operation 174, any cellular devices 14 that have been logged into the blacklisted cellular devices file 32 are denied cellular service by the control system 20. In operation 176, a device report is sent to the cellular control panel 26 of all cellular devices 14 attempting to access the system 10, and then operation 166 is repeated.

With further reference to FIG. 8, when the descent of the aircraft 12 begins, as indicated at operation 178 (via the determination made at inquiry 166), the picocell 16 is placed in the "listen only" mode by the control system 20, as indicated at operation 180. Any cellular devices that are detected as being turned "on" are then reported by the control system 20 to the control panel 26 at operation 182. The weight-on-wheels information 22 is considered at operation 184, and a landing/taxi-in operational state is reported to the system 10 at operation 186 when the weight-on-wheels information 22 indicates that the aircraft 12 has landed. A check is then made in operation 190 if operation of cellular devices is authorized at this point while the aircraft 12 is on the ground. If the answer is "yes", then the system 10 may be powered off at operation 192. If the answer at inquiry 190 is "no", then a report of the violating cellular device 14 is sent to the control panel 26.

Thus, by combining flight information from the aircraft avionics system 18 (FIG. 1) of the aircraft 12, and the information detected by the picocell 16 of the system 10, an automatic decision can be made by the system 10 as to whether or not to accept or deny service to particular cellular devices 14. Advantageously, this is accomplished without crew member intervention. The system 10 also satisfies a security requirement by preventing cellular devices in the cargo bay of the aircraft 12 from being accessed terrestrially while the aircraft is in flight. This also prevents an on-board cellular device 14, which is not in compliance with cellular operating rules, from accessing the terrestrial service provider's ground network. It also significantly reduces the possibility of using an on-board cellular device as a means to provide a remote form of "trigger" by a terrestrial based device. The system 10 also provides an automatic means of monitoring, controlling, and dissuading passengers from attempting to use cellular devices or leaving cellular devices in a transmit mode during critical phases of flight. Both of these restrictions are accomplished quickly and reliably with the same method of logging a particular cellular device's non-compliance in a blacklist (i.e., file 32), which is created by the control system 20 from wireless signals detected by the listening picocell 16 during restricted phases of flight. Advantageously, the blacklisted cellular devices file 32 can be automatically cleared by the system 10 at a predetermined operational point, for example when aircraft 12 has left the ground and is in a climb phase of operation.

It is expected that the system 10 will be effective at dissuading passengers from attempting to use cellular devices during restricted phases of flight. The ability of the system 10 to prevent any off-board wireless communication from the aircraft 12, once the aircraft reaches its cruise altitude, is expected to be a strong, motivating factor in inducing passengers to comply with rules and regulations concerning when cellular devices can be used on the aircraft 12. The system 10, since it provides monitoring, reporting and logging functions automatically, reduces the workload of the cabin crew with regard to monitoring the operation of cellular devices in the aircraft 12 while the aircraft is operating.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for monitoring operation of wireless personal electronic devices (PEDs) present on a mobile platform, comprising:
defining at least one phase of operation of the mobile platform, where the use of wireless PEDs is prohibited;
using a wireless communications system on the mobile platform to monitor and detect signals being transmitted by wireless PEDs present on the mobile platform;
using said system to detect a transmission from a wireless PED located on the mobile platform, that occurs during said one phase of operation;
recording an identification code associated with a specific one of said wireless PEDs, that is detected as operating during said one phase of operation, in a file;
thereafter checking said file during a second phase of operation where use of said wireless PEDs is permitted; and
denying use of said wireless communications system to said one wireless PED when said identification code of said one wireless PED is determined to be stored in said database, to prevent said wireless PED from communicating during said second phase of operation with a communications network remote from the mobile platform.

2. The method of claim 1, wherein the operation of using said wireless communications system comprises using a cellular picocell located on the mobile platform.

3. The method of claim 1, wherein the operation of using said wireless communications system on the mobile platform comprises using a cellular communications system located on an airborne mobile platform.

4. The method of claim 3, wherein the operation of using said wireless communications system located on the airborne mobile platform comprises using a cellular communications system located on an aircraft.

5. The method of claim 3, wherein said defining at least one phase of operation of the airborne mobile platform comprises defining a time period between when said airborne mobile platform is operating on a ground surface at an airport and when said airborne mobile platform reaches a predetermined altitude during flight.

6. The method of claim 3, wherein said defining at least one phase of operation of the airborne mobile platform comprises defining a time period between when said airborne mobile platform has descended below a predetermined altitude and when said airborne mobile platform has landed on a ground surface at an airport.

7. The method of claim 3, further comprising identifying if said wireless PED is pre-authorized to operate during said one phase of operation, and allowing operation of said wireless PED during said one phase of operation.

8. The method of claim 3, further comprising using weight-on-wheels information obtained from an avionics subsystem of the airborne mobile platform, to indicate when said airborne mobile platform is operating on said ground surface at said airport and when said airborne mobile platform has left said ground surface.

9. A method for monitoring operation of cellular devices present on an airborne mobile platform, comprising:

defining at least one phase of operation of the airborne mobile platform, where the use of cellular devices is prohibited;

using a cellular system having a picocell on the airborne mobile platform to monitor and detect signals being transmitted by cellular devices present on the airborne mobile platform;

using said picocell to detect a transmission from a particular cellular device located on the airborne mobile platform, that occurs during said one phase of operation;

recording an identification code associated with said particular cellular device in a file; and thereafter denying use of said cellular system to said particular cellular device during a different phase of operation of the airborne mobile platform when use of said cellular devices is allowed, to prevent said particular cellular device from communicating with a cellular network remote from the airborne mobile platform during said different phase of operation.

10. The method of claim 9, wherein said one phase of operation of said airborne mobile platform comprises a phase of operation between when said airborne mobile platform is operating on a ground surface at an airport and when said airborne mobile platform has reached a predetermined altitude during an ascent phase of flight.

11. The method of claim 9, wherein said one phase of operation of said airborne mobile platform comprises a phase of operation between when said airborne mobile platform has descended below a predetermined altitude while airborne, and when said airborne mobile platform has landed on a ground surface at an airport.

12. The method of claim 9, wherein said file is associated with a cellular control system, and said file identifies said particular cellular device as a device that has violated a rule prohibiting operation during said one phase of operation.

13. The method of claim 12, further comprising displaying on a display system associated with said control system an indication of said particular cellular device.

14. The method of claim 9, further comprising identifying if said particular cellular device is pre-authorized to operate during said one phase of operation, and allowing operation of said particular cellular device during said one phase of operation.

15. The method of claim 9, further comprising using weight-on-wheels information associated with said mobile platform to indicate when said airborne mobile platform is in contact with said ground surface.

16. The method of claim 9, further comprising creating a log of every one of said cellular devices present on said airborne mobile platform that has been detected as operating while inside of said airborne mobile platform.

17. A wireless communications system for managing use of wireless personal electronic devices (PEDs) within a mobile platform, comprising:

a communication cell located on said mobile platform that is able to detect the presence of wireless PEDs that are transmitting while located inside of said mobile platform;

a control system associated with said communications cell that is programmed to recognize an operational phase of said mobile platform during which operation of wireless PEDs is prohibited; and the control system further being in communication with said communications cell to receive an identification code from said communications cell of a particular wireless PED that is transmitting during said operational phase, where use of wireless PEDs is prohibited;

recording in a file, associated with the control system, the identification code of said particular wireless PED that was detected as operating during said operational phase;

and the control system being programmed to thereafter deny use of said wireless communications system to said particular wireless PED during a different operational phase of said mobile platform where use of said wireless PEDs is otherwise permitted.

18. An aircraft comprising:

an on-board wireless communications system including a picocell for facilitating two-way communications between wireless personal electronic devices (PEDs) on board the aircraft, and an off-board wireless network, each said wireless PED transmitting a unique identification code while it is powered on;

a control system associated with said on-board wireless communications system for detecting when said wireless PEDs present on said aircraft are transmitting; and said control system having a file for logging said identification code of each said wireless PED that is detected as transmitting during a phase of operation of said aircraft where use of wireless PEDs is not permitted, and said control system operating to block access to said on-board wireless communications system by any said wireless PED identified in said file, for those times of operation of said aircraft where use of wireless PEDs would otherwise be allowed.

* * * * *